(12) United States Patent
Shimobayashi

(10) Patent No.: US 8,270,339 B2
(45) Date of Patent: Sep. 18, 2012

(54) MOBILE COMMUNICATION SYSTEM, MOBILE COMMUNICATION TERMINAL, AND MOBILE COMMUNICATION METHOD

(75) Inventor: Shinya Shimobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1194 days.

(21) Appl. No.: 11/997,990

(22) PCT Filed: Aug. 3, 2006

(86) PCT No.: PCT/JP2006/315378
§ 371 (c)(1),
(2), (4) Date: Mar. 10, 2008

(87) PCT Pub. No.: WO2007/023654
PCT Pub. Date: Mar. 1, 2007

(65) Prior Publication Data
US 2010/0254305 A1  Oct. 7, 2010

(30) Foreign Application Priority Data

Aug. 22, 2005 (JP) .................................. 2005-239998

(51) Int. Cl.
*H04B 7/185* (2006.01)
(52) U.S. Cl. ...................................... 370/318; 455/13.4
(58) Field of Classification Search .................. None
See application file for complete search history.

(56) References Cited

U.S. PATENT DOCUMENTS

| | | | |
|---|---|---|---|
| 6,628,924 B1* | 9/2003 | Miyamoto | 455/69 |
| 2001/0003536 A1* | 6/2001 | Kurihara | 375/345 |
| 2002/0067702 A1* | 6/2002 | Imura | 370/318 |
| 2002/0080853 A1* | 6/2002 | Zeira et al. | 375/130 |
| 2003/0053426 A1* | 3/2003 | Tsunehara et al. | 370/318 |
| 2006/0013334 A1* | 1/2006 | Touchais et al. | 375/297 |
| 2006/0116076 A1* | 6/2006 | Li et al. | 455/41.2 |
| 2006/0171342 A1* | 8/2006 | Dateki | 370/311 |
| 2008/0311864 A1* | 12/2008 | Wallis | 455/115.1 |

FOREIGN PATENT DOCUMENTS

| | | |
|---|---|---|
| JP | 2000-244391 A | 9/2000 |
| JP | 2003-234696 A | 8/2003 |
| JP | 2004-260489 A | 9/2004 |
| JP | 2005-175945 A | 6/2005 |
| WO | 2005/055447 A1 | 6/2005 |

\* cited by examiner

*Primary Examiner* — Marcus R Smith
*Assistant Examiner* — Eunsook Choi
(74) *Attorney, Agent, or Firm* — Sughrue Mion, PLLC

(57) ABSTRACT

In mobile communication between a base station and a mobile station, reception quality is prevented from being degraded even when transmission power supplied from a base station is remarkably changed. A code generated in accordance with an amount of change in transmission power is transmitted from the base station to the mobile station. In the mobile station, the code generated by the base station is detected by a detector (25), a receiving gain which amplifies or attenuates the signal transmitted from the base station is changed and set by an amplifier controlling section (26) in accordance with the code detected by the detector (25), and the signal transmitted from the base station is amplified or attenuated by an amplifier (21) with the set receiving gain.

1 Claim, 4 Drawing Sheets

MOBILE COMMUNICATION SYSTEM, MOBILE COMMUNICATION TERMINAL, AND MOBILE COMMUNICATION METHOD

TECHNICAL FIELD

The present invention relates to a mobile communication system using a digital communication method such as an HSDPA (High Speed Downlink Packet Access) method, a mobile communication terminal, and a mobile communication method.

It is preferable that a large amount of data can be transmitted in a direction toward a mobile station from a base station at high speed. To achieve this, use of technology called the HSDPA method is under review. The HSDPA is standardized by 3GPP™ ($3^{rd}$ Generation Partnership Project).

In some cases, in the HSDPA method, the number of codes of an HS-PDSCH (High Speed Physical Downlink Shared Channel) for an entire base station may change depending on the number of terminals to receive data and/or a signal transmission rate.

Also, when attention is focused on a given one code, there is a possibility that the terminal to receive data changes in unit of 2 ms subframe. Moreover, the number of codes for the HS-PDSCH method employed in the entire base station changes depending on the number of terminals to receive data or on a transmission rate required by the terminal to receive data.

Due to this, a possibility occurs that, during a given subframe, a part of the codes for the HS-PDSCH is not transmitted causing DTX (Discontinuous Transmission) and, in the subsequent subframe, 15 codes being the maximum number of codes for the HS-PDSCH are transmitted.

In such a situation as above, transmission power fed from a base station serving as a sender side remarkably changes, causing the occurrence of bit overflow, clipping, or a like in an A-D (Analog-Digital) converter in a terminal serving as a receiver side and, as a result, reception quality of data is possibly degraded.

A system is disclosed in, for example, Patent Reference 1 in which a mobile terminal transmits a command for increasing or decreasing transmission power to a base station according to quality of signals received by the mobile station.

Another system is disclosed in, for example, Patent Reference 2 in which an amplification factor of reception power is changed depending on magnitude of transmission power.

Patent Reference 1: Japanese Patent Application Laid-open No. 2003-234696 (paragraphs 0020 to 0034 and FIG. 1).

Patent Reference 2: Japanese Patent Application Laid-open No. 2004-260489 (paragraphs 0019-0030 and FIG. 1)

DISCLOSURE OF THE INVENTION

Problems to be Solved by the Invention

However, in the system disclosed in the Patent Reference 1, a base station cannot transmit, in advance, signals by transmission power that meets power level required by a mobile station. Therefore, the mobile station cannot input signals having magnitude corresponding to input rating of the A-D converter or a like, thus resulting in possible degradation of reception quality.

Also, in the system disclosed in the Patent Reference 2, an amplification rate of reception power cannot be changed depending on quality of reception signals.

Thus, an object of the present invention is to provide a mobile communication system which is capable of preventing the degradation of reception quality even when transmission power to be supplied from a base station changes greatly, the mobile communication method using the mobile communication system and the mobile communication terminal for the mobile communication system.

Means for Solving Problems

The mobile communication system of the present invention is a system in which a mobile terminal changes a receiving gain of a signal according to a change in transmission power supplied by a base station, wherein the base station includes a coding section to generate codes according to an amount of change in transmission power, wherein the mobile station includes a detecting section to detect codes generated by the coding section, a receiving gain setting section to change and set a receiving gain to amplify or attenuate a signal transmitted from the base station according to codes detected by the detecting section, and a signal amplifying section to amplify or attenuate a signal transmitted from the base station using the receiving gain set by the receiving gain setting section.

The above receiving gain setting section is configured to set a receiving gain by changing an amount of signal amplification and an amount of signal attenuation serving as a receiving gain of the signal amplifying section according to codes detected by the detecting section.

The above receiving gain setting section is configured to calculate a receiving gain to be used in the signal amplifying section by using a time constant to gently change the receiving gain.

The above mobile station includes an A-D converting unit, wherein the receiving gain setting section is configured to set a receiving gain to be used for the signal amplifying section so that a signal transmitted from the base station has magnitude being large enough to allow the conversion of the transmitted signal to a digital signal by the A-D converting section.

The above detecting unit calculates the likelihood of certainty of codes detected by the detecting section and wherein the receiving gain setting section sets a receiving gain by changing the receiving gain of the signal amplifying section if the likelihood calculated by the detecting section is a preset threshold value or more.

The mobile communication system of the present invention uses the HSDPA method as a communication method, wherein the coding section is configured preferably to assign a bit string being not used in the HSDPA out of bit strings for channelization code access sets of the HSDPA to codes according to an amount of change in transmission power.

The above coding section, when codes corresponding to an amount of change in transmission power are generated, masks the generated codes by using a bit string peculiar to a mobile station or a bit string being commonly used by all mobile stations and a decoding section to decode the masked codes is provided in the mobile station.

The mobile communication terminal of the present invention for changing a receiving gain of a signal according to a change in transmission power supplied by a base station includes a detecting section to detect codes generated by the base station according to a change in transmission power, a receiving gain setting section to change and set a receiving gain to amplify or attenuate a signal transmitted from the base station according to codes detected by the detecting section, and a signal amplifying unit to amplify or attenuate a signal transmitted from the base station using a receiving gain set by the receiving gain setting section.

The mobile communication method of the present invention is a method by which a signal receiver changes a receiving gain of a signal according to a change in transmission power supplied by a signal sender, including a coding step of generating codes according to an amount of change in transmission power, a detecting step of detecting a code generated in the coding step, a receiving gain setting step of changing and setting a receiving gain to amplify or attenuate a signal according to codes detected in the detecting step, and a signal amplifying step of amplifying or attenuating a signal using a receiving gain set in the receiving gain setting step.

Effects of the Invention

According to the present invention, since code information about a change in transmission power is transferred from the base station to the mobile station, a receiving gain can be adjusted by the mobile station and a countermeasure against the change in transmission power is taken, thus preventing the degradation of receiving quality.

According to the present invention, the mobile station further includes an A-D converting means for converting a signal transmitted from the base station to a digital signal and the receiving gain setting means is configured to set a receiving gain to be used in a signal amplifying means so that the signal transmitted from the base station has magnitude being enough to allow the A-D converter to convert the transmitted signal to a digital signal and, therefore, in the A-D converting means, the occurrence of bit overflow and/or clipping can be prevented.

When the detecting means is configured to calculate the likelihood of certainty of detected codes, it is made possible to change a receiving gain depending on the likelihood and to set the changed receiving gain.

When the coding means is configured to mask codes generated using a bit string peculiar to the mobile station or a bit string being commonly used for all mobile stations and when the decoding means to decode the masked codes is placed in the mobile station, the mobile station can inform specified mobiles or all mobile stations of a change in transmission power.

EXPLANATION OF LETTERS AND NUMERAL

Figure 1:
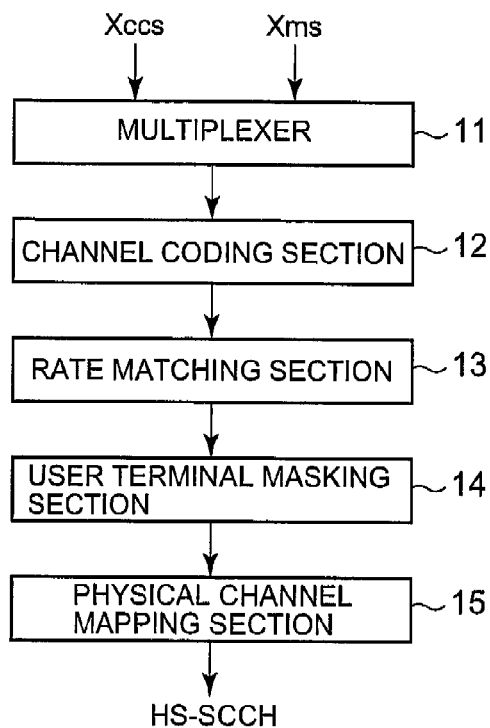
FIG. 1 is a block diagram showing an example of configurations of a coding section in a base station of a mobile communication system of the present invention.

11: Multiplexer
12: Channel coding section
13: Rate matching section
14: User terminal masking section
15: Physical channelization mapping section
21: Amplifier
22: A-D converter
23: HS-SCCH de-spreader
24: HS-SCCH decoder
25: Detector
26: Amplifier controlling section
27: HS-PDSCH de-spreader

BEST MODE OF CARRYING OUT THE INVENTION

Some preferred embodiments of the present invention are described by referring to the appended drawings. FIG. 1 is a block diagram showing one example of configurations of a coding section (coding means) to perform coding for an HS-SCCH (Shared Control Channel for High Speed Downlink Shared Channel) in a base station of the mobile communication system of the present invention.

The coding section includes a multiplexer 11 to establish the HS-SCCH by mixing Xccs being bit strings of a channelization code set to be used in the HS-PDSCH and Xms being bits representing a modulation scheme of corresponding HS-PDSCH, a channel coding section 12 to perform coding of the HS-SCCH, a rate matching section 13 to thin out specified bits from the HS-SCCH bits on which the channel coding is performed, a user terminal masking section 14 to perform an exclusive OR operation between a bit string peculiar to the mobile communication terminal and a bit string for the HS-SCCH on which the thinning-out operation is performed by the rate matching section 13, and a physical channel mapping section 15 to perform a mapping operation on the physical channel.

Each Xcc is derived from the following equations.

$$Xccs,1,Xccs,2,Xccs,3=\min(P-1,15-P) \qquad (1)$$

$$Xccs,4,Xccs,5,Xccs,6,Xccs,7=|0-1-[P/8]\times 15| \qquad (2)$$

In the above equations (1) and (2), "P" denotes the number of codes for the HS-PDSCH. "O" denotes the number of the first channelization out of codes to be used. Moreover, out of the channelization code sets derived from the above equations (1) and (2), 8 codes (bit string) including 1110000, 1110001, 1110010, 1110011, 1110100, 1110101, 1110110 and 1110111 are not used. In the embodiment, these codes are used as codes representing a change in transmission power supplied from the base station.

That is, according to the embodiment, out of bit strings that inform a mobile communication terminal of a channelization set for the HS-PDSCH, bit strings not used ordinarily are employed to inform of a change in transmission power supplied from the base station.

More specifically, assuming that an amount of change in transmission power with respect to a subframe existed immediately before is set to be X, 1110000 is used to notify the change in transmission power supplied from the base station when $-16\ dB \leq X < -12\ dB$, 1110001 when $-12\ dB \leq X < -8\ dB$, 1110010 when $-8\ dB \leq X < -4\ dB$, 1110011 when $-4\ dB \leq X < 0\ dB$, 1110100 when $0\ dB \leq X < +4\ dB$, 1110101 when $+4\ dB \leq X < +8\ dB$, 1110110 when $+8\ dB \leq X < +12\ dB$, and 1110111 when $+12\ dB \leq X < +16\ dB$.

Ordinarily, the HS-SCCH data is transmitted only to a specified mobile communication terminal and, therefore, the HS-SCCH data is masked by a UEID (User Equipment Identification) being a bit string peculiar to the mobile communication terminal and is normally decoded only by the specified mobile communication terminal. Thus, when information about a change in transmission power supplied from the base station is to be informed only to the specified mobile communication terminal, the HS-SCCH data is masked by the UEID to be transmitted to the mobile communication terminal.

Also, when information about a change in transmission power supplied from the base station is to be informed to all mobile communication terminals to carry out communication with base stations, ID (Identification) (common ID) being able to be used commonly in all mobile communication terminals is set in advance. Then, HS-SCCH data is masked by the common ID to be transmitted to the mobile communication terminals.

Moreover, the Xms being "0" denotes the case where a signal is modulated with a QPSK (Quadrature Phase Skill Keying) method and the Xms being "1" denotes the case where the signal is modulated by using a 16—QAM (16—ary Quadrature Amplitude Modulation) method.

The channel coding section 12 performs convolutional coding of the HS-SCCH at a coding rate of ½ and generates a bit string of length 48 bits. The rate matching section 13 thins out $1^{st}$, $2^{nd}$, $4^{th}$, $8^{th}$, $42^{nd}$, $45^{th}$, $47^{th}$ and $48^{th}$ bits from the bit string of length 48 bits generated by the channel coding section 12 to generate a bit string of length of 40 bits.

The user terminal masking section 14 adds a tail bit consisting of 8 bits to a bit string of length 16 peculiar to a mobile communication terminal (user terminal) and performs convolutional coding at the coding rate of ½ to generate a bit string of length 48 bits. Then, the user terminal masking section 14 thins out $1^{st}$, $2^{nd}$, $4^{th}$, $8^{th}$, $42^{nd}$, $45^{th}$, $47^{th}$ and $48^{th}$ bits from the generated bit string of length 48 bits to generate a bit string of length of 40 bits.

Moreover, the user terminal masking section 14 performs an exclusive OR operation between the bit string of length 40 bits derived from the bit string of length 16 bits peculiar to the mobile communication terminal and the bit string of length 40 bits derived by the rate matching section 13.

The physical channel mapping section 15 maps the bit string of length 40 bits being the exclusive OR calculated by the user terminal masking section 14 during the first slot making up a subframe for the HS-SCCH.

Additionally, operations described above are based on operations set forth in chapters 4.6.1, 4.6.2, 4.6.3, 4.6.5, 4.6.6, 4.6.7, and 4.6.8 of "3GPP TS 25. 212.V5. 10.0" being 3GPP Technical Specifications except operations of using a code as a code representing a change in transmission power supplied from the base station.

Figure 2:
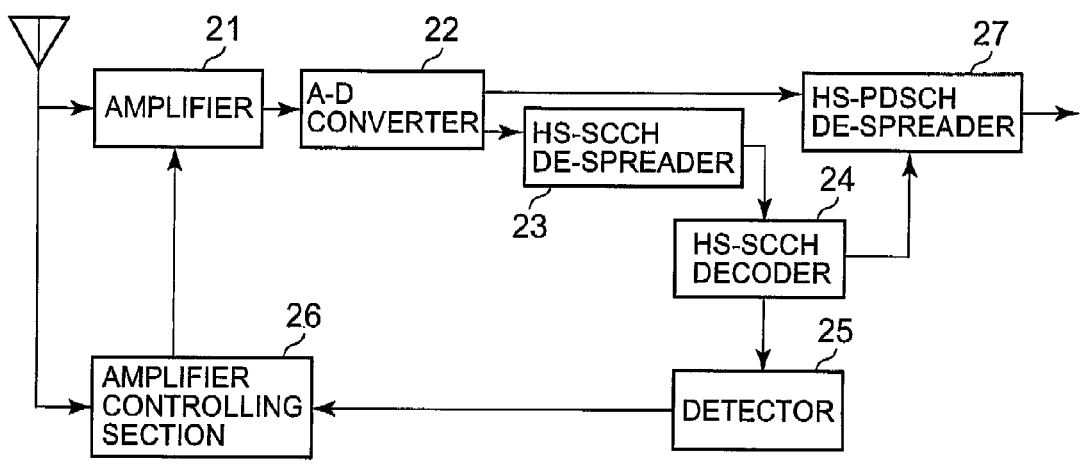
FIG. 2 is a block diagram schematically showing configurations of a mobile communication terminal according to an embodiment of the present invention.

FIG. 2 is a block diagram schematically showing configurations of the mobile communication terminal of the embodiment of the present invention.

The mobile communication terminal (mobile station) of the present invention includes an amplifier (signal amplifying means) 21 to amplify or attenuate signals received by an antenna to be then outputted, an A-D converter (A-D converting means) 22 to convert the received signals outputted from the amplifier into digital signals, an HS-SCCH de-spreader 23 to fetch HS-SCCH signals from the received signals, an HS-SCCH decoder (decoding means) 24 to regenerate bit strings for the Xcc and Xms from the HS-SCCH signals, a detector (detecting means) 25 to judge whether or not the bit string for the Xcc is a specified bit string, an amplifier controlling section 26 to exert control on the amplifier 21, and an HS-PDSCH de-spreader 27 to fetch HS-PDSCH signals from the received signals.

The amplifier 21 amplifies or attenuates received signals according to a control of the amplifier controlling section within a range that the A-D converter 22 can perform processing.

The HS-SCCH de-spreader 23 multiplies a scramble code and a channelization code for the HS-SCCH by received signals converted into digital signals to de-spread and to fetch the de-spread HS-SCCH signals from the received signals.

The HS-SCCH decoder 24 performs processing being reverse to processing to be performed by each of the sections shown in FIG. 1 on the HS-SCCH signals fetched by the HS-SCCH de-spreader 23 to regenerate bit strings for the Xccs and Xms and calculates the channelization code and the number of codes for the HS-PDSCH.

The detector 25 judges whether or not bit strings for the Xcc regenerated by the HS-SCCH decoder 24 are 1110000, 1110001, 1110010, 1110011, 1110100, 1110101, 1110110, or 1110111 each representing a change in transmission power supplied from the base station.

Moreover, the detector 25 calculates the likelihood representing certainty of a bit string for the Xccs regenerated by the HS-SCCH decoder 24. The likelihood in the case where the bit string for the Xcc regenerated by the HS-SCCH decoder 25 is 100% certain is "1" and in the case where the bit string is 80% certain is "0.8". Then, the detector 25 compares the calculated likelihood with a threshold value set in advance.

The amplifier controlling section 26 calculates a signal receiving gain of the amplifier 21 based on power of a signal received by an antenna. Then, the amplifier controlling section 26 makes the amplifier 21 amplify or attenuate received signals based on the calculated signal receiving gain. Also, the amplifier controlling section 26, when the detector 25 detects a bit string representing a change in transmission power supplied from the base station, controls an amount of signal amplification or an amount of signal attenuation of the amplifier 21 according to detection results so that these amounts become constant.

The HS-PDSCH de-spreader 27 performs reverse spreading based on a bit string (that is, channelization code) for the Xccs decoded by the HS-SCCH decoder 24 and on the number of codes for the HS-PDSCH calculated by the HS-SCCH decoder 24 to fetch HS-PDSCH signals from received signals.

Figure 3:
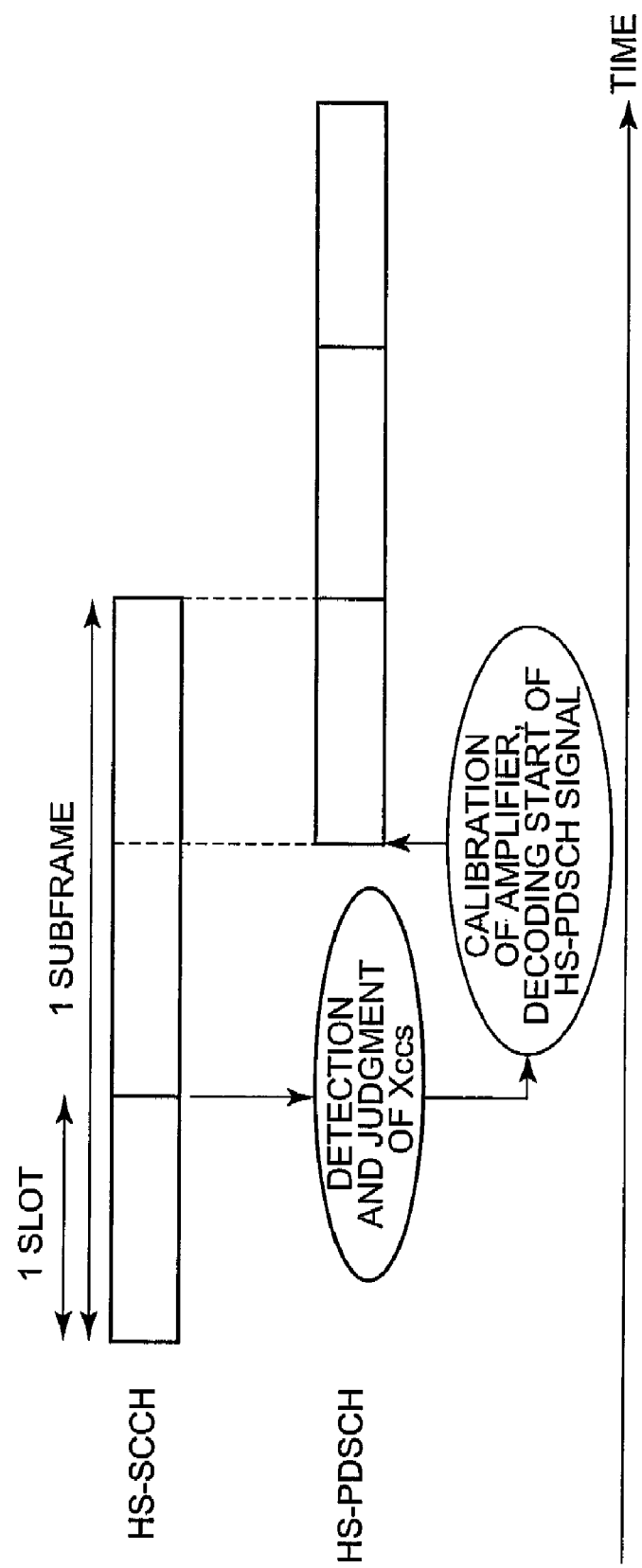
FIG. 3 is an explanatory diagram showing timing with which a detector detects an HS-SCCH signal and an HS-PDSCH signal.

FIG. 3 is an explanatory diagram showing timing with which the detector 25 detects the HS-SCCH signals and HS-PDSCH signals.

As shown in FIG. 3, the HS-PDSCH signal is transmitted from the base station with time delay corresponding to 2 slots after the HS-SCCH signal has been transmitted. The bit string containing the Xccs of this embodiment is mapped during the first slot making up a subframe for the HS-SCCH. Therefore, in the mobile communication terminal, after receiving the HS-SCCH signals during one slot, the HS-SCCH decoder 24 decodes received signals and the detector 25 judges whether or not the bit string for the Xcc is a specified bit string.

Then, when the detector 25 judges that the bit string for the Xccs is the specified bit string, the amplifier controlling section 26 exerts control in the subframe starting with its head being the timing with which a change in transmission power supplied from the base station occurs.

Figure 4:
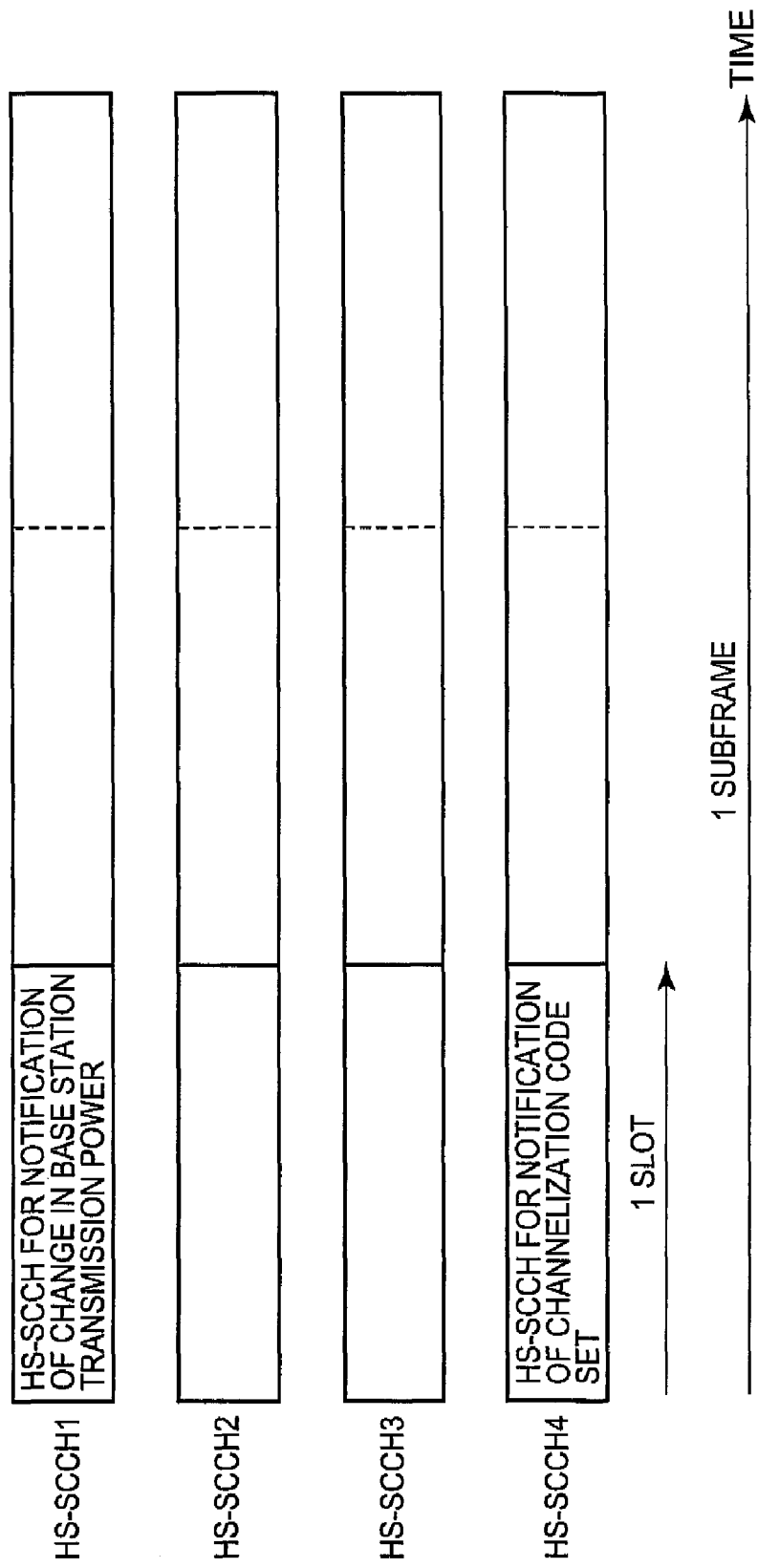
FIG. 4 is an explanatory diagram showing a channelization code set for the HS-HS-SCCH and notification of a change in transmission power supplied from a base station.

FIG. 4 is an explanatory diagram showing a channelization code for an HS-SCCH and a notification of a change in transmission power supplied from the base station.

The mobile communication terminal has a capability of decoding the maximum four HS-SCCH signals. In the example shown in FIG. 4, the first HS-SCCH signal contains a bit string for the Xccs of the notification of a change in transmission power supplied from the base station. Also, the fourth HS-SCCH signal contains a bit string for the Xccs of the channelization set required when the HS-PDSCH signal is decoded.

Thus, in this embodiment, in order to notify a change in transmission power supplied from the base station, it is assumed that a dedicated HS-SCCH is used.

Figure 5:
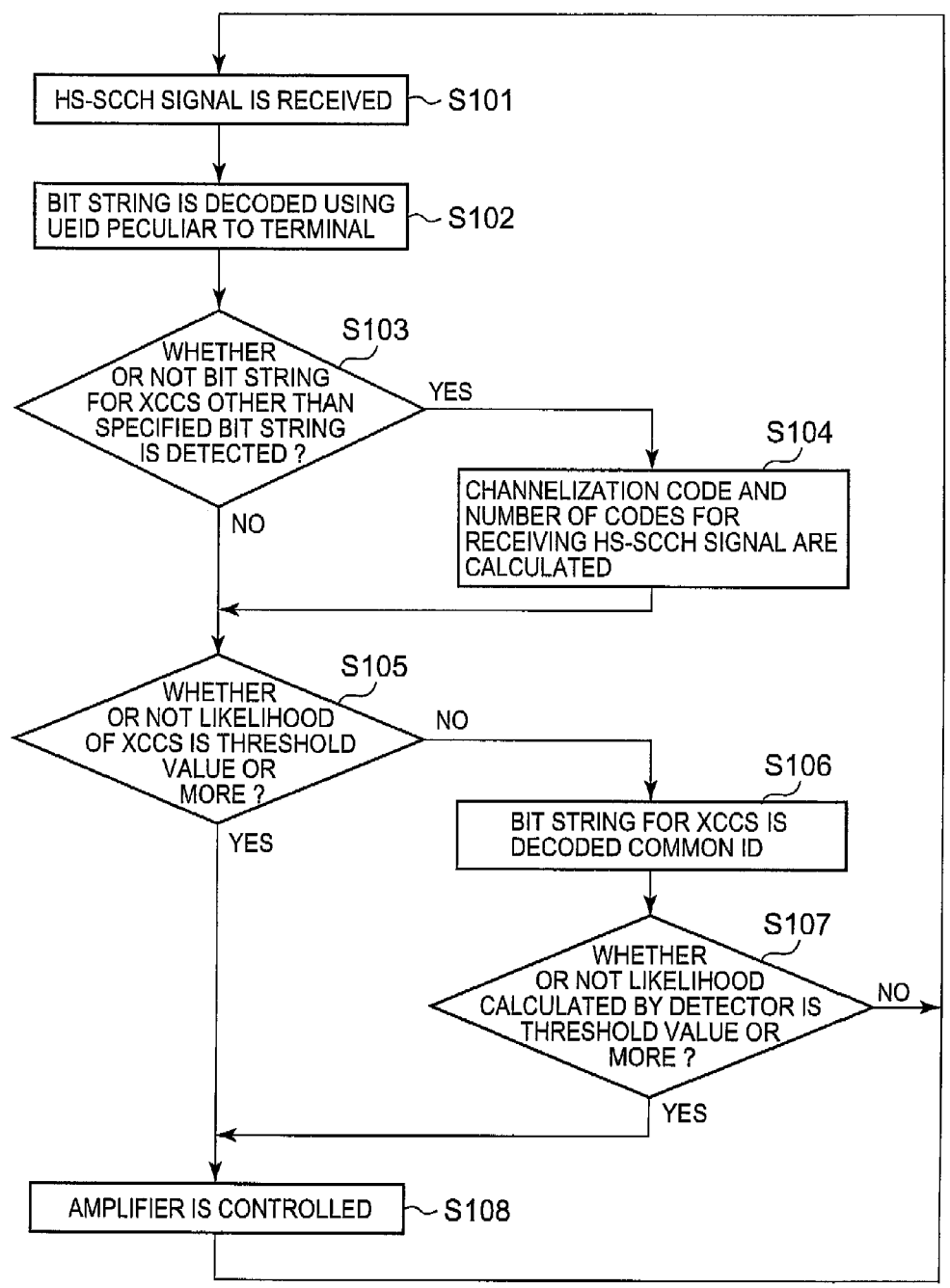
FIG. 5 is a flowchart explaining operations of the mobile communication terminal of the embodiment of the present invention.

Next, operations of the mobile communication terminal of the present invention are described by referring to drawings. FIG. 5 is a flow chart explaining operations of the mobile communication terminal of the embodiment of the present invention.

When an antenna receives signals, the amplifier outputs the signal received by the antenna to the A-D converter 22. The A-D converter 22 outputs the received signal into digital signals and outputs the converted signal to the HS-SCCH de-spreader 23. To the HS-SCCH de-spreader are inputted the maximum four HS-SCCH signals at the same time (Step S101).

The HS-SCCH de-spreader 23 takes HS-SCCH signals out from received signals and outputs the signal to the HS-SCCH decoder 24. The HS-SCCH decoder 24 regenerates (decodes) bit strings for the Xccs and Xms from the HS-SCCH signals using an UEID (Step S102).

The HS-SCCH decoder 24 outputs the decoded bit string for the Xccs to the detector 25. The detector 25 judges whether or not the inputted bit string for the Xccs contains any bit string other than the specified bit string representing a change in transmission power supplied from the base station (Step S103).

The HS-SCCH decoder 24, when the detector 25 judges that the inputted bit string for the Xccs contains the bit string other than the specified bit string representing a change in transmission power supplied from the base station, calculates a channelization code and the number of codes (Step S104) and outputs the calculated result to the HS-PDSCH de-spreader 27.

The detector 25, when judging that the bit string for the Xcc inputted in the Step S103 does not contain any bit string other than the specified bit string representing a change in transmission power supplied from the base station (in the case of NO in Step S103) or when calculating the channelization code and the number of codes from the decoded bit string for the Xccs (Step 104), calculates the likelihood of the bit string regenerated by the HS-SCCH decoder 24.

The detector 25 compares the calculated likelihood with a threshold value set in advance (Step S105) and, if the calculated likelihood is less than the threshold value set in advance, the HS-SCCH decoder 24 regenerates (decodes) the bit string for the Xccs and Xms from the HS-SCCH signals by using a common ID (Step S106).

The HS-SCCH decoder 24 outputs the bit string for the decoded Xccs to the detector 25. The detector 25, when the bit string inputted by the HS-SCCH decoder 24 contains the specified bit string representing a change in transmission power supplied from the base station, calculates the likelihood of the bit string and compares the likelihood with the threshold value inputted in advance (Step S107).

The amplifier controlling section 26, when judging that the likelihood calculated by the detector 25 in the Steps 105 and 107 is the threshold value or more, controls the amplifier (Step S108).

The comparison between the likelihood and the threshold value is described specifically. For example, if the threshold value is 0.8 and the likelihood calculated by the detector 25 in the Steps 105 and 107 is 0.9, the likelihood is the threshold value or more.

The control on the amplifier 21 by the amplifier controlling section 26 is described specifically. For example, if the regenerated bit string for the Xccs is 1110000 and, assuming that a change value of transmission power applied during a sub-frame existed immediately before is X, if $-16$ dB$\leqq$X<$-12$ dB, the transmission power is smaller by about 14 dB compared with the transmission power fed during the subframe existed immediately before. As a result, the amplifier controlling section 26 sets a receiving gain of the amplifier to be larger by 14 dB.

Also, the amplifier controlling section 26, in order to gently change a receiving gain of the amplifier 21, may set the receiving gain of the amplifier 21 by using a time constant.

More specifically, the receiving gain b(n) to be set to the amplifier 21 can be obtained by the following equation:

$$b(n)=k \times a(n)+(1-k) \times b(n-1)$$

where a(n) denotes a change in transmission power, b(n−1) denotes a receiving gain set to the amplifier 21, and k denotes a time constant. Moreover, by ordinarily setting the time constant k to be 0.5 and, when the regenerated bit string for the Xccs shows that the change in transmission power is sharp, by setting the time constant to be about 0.9, the receiving gain of the amplifier 21 can be changed gently.

As described above, according to the present invention, in order for the base station to inform, in advance, a mobile station of a change in transmission power, the mobile station calibrates a receiving gain to take a countermeasure against the change in transmission power and, therefore, the degradation of signal reception quality can be prevented.

More specifically, the amplifier controlling section 26 adjusts a receiving gain of the amplifier 21 and, as a result, the occurrence of bit overflow, clipping, or a like in the A-D converter 22 can be prevented.

Also, in the above embodiment, the case where the UEID is used for masking a code representing a change in transmission power of a base station and the case where the common ID is used are shown as the example, however, the present invention is not limited to this and only either of the UEID or common ID may be used.

Also, in the above embodiment, the detector 25 calculates the likelihood and compares the calculated likelihood with a threshold value, however, the present invention is not limited to this and there is no need for calculation of the likelihood and for using a threshold value. That is, if the bit string for the Xccs decoded by the HS-SCCH decoder 24 is a specified bit string representing a change in transmission power of a base station, the detector 25 may operate in a manner to allow for a change in transmission power supplied from the base station.

Furthermore, in the above embodiment, codes are assigned to a change value of transmission power supplied from the base station at 4 dB intervals, however, the present invention is not limited to this and the codes may be assigned at 3 dB, 5 dB interval, or a like.

Industrial Applicability

The present invention can be suitably used for a base station of a portable phone system and/or portable phone carried out in the HSDPA communication method.

The invention claimed is:

1. A mobile communication system comprising:
a mobile terminal and a base station,
wherein said mobile terminal changes a receiving gain of a signal according to a change in transmission power supplied by said base station,
wherein said base station comprises a coding unit to generate codes according to an amount of change in transmission power,
wherein said mobile terminal comprises a detecting unit to detect codes generated by said coding unit, a receiving gain setting unit to change and set a receiving gain to amplify or attenuate a signal transmitted from said base station according to codes detected by said detecting unit, and a signal amplifying unit to amplify or attenuate a signal transmitted from said base station using the receiving gain set by said receiving gain setting unit, and wherein an HSDPA (High Speed Downlink Packet Access) method is used as a communication method, wherein said coding unit is configured to assign a bit string being not used in the HSDPA out of bit strings for channelization code access sets of the HSDPA to a code according to an amount of change in transmission power.

\* \* \* \* \*